Figure 1:
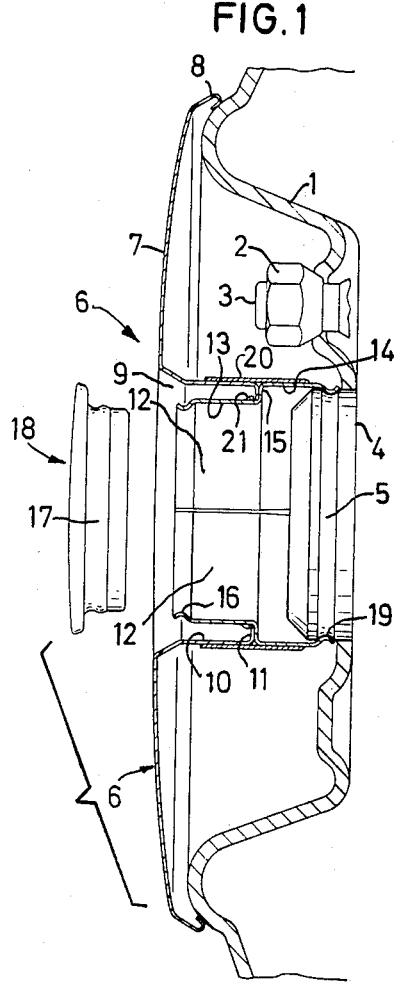

United States Patent [19]

Arvidsson

[11] 4,235,476
[45] Nov. 25, 1980

[54] WHEEL COVER FOR VEHICLE WHEELS

[75] Inventor: Krister E. G. Arvidsson, Västra, Frölunda, Sweden

[73] Assignee: AB Volvo, Goteborg, Sweden

[21] Appl. No.: 56,397

[22] Filed: Jul. 10, 1979

[30] Foreign Application Priority Data

Aug. 8, 1978 [SE] Sweden .............................. 7808477

[51] Int. Cl.³ .......................... B60B 7/04; B60B 7/06
[52] U.S. Cl. ............................ 301/108 R; 301/37 CM; 301/37 TP
[58] Field of Search .......... 301/37 R, 37 AT, 37 CM, 301/37 C, 37CD, 37 TP, 37 PB, 108 R, 108 A, 108 TW

[56] References Cited

U.S. PATENT DOCUMENTS

| | | | |
|---|---|---|---|
| 2,474,853 | 7/1949 | Lyon | 301/37 C |
| 2,898,155 | 8/1959 | Lyon | 301/37 PB |
| 2,969,257 | 1/1961 | Lyon . | |
| 3,078,124 | 2/1963 | Mulder . | |
| 4,040,672 | 8/1977 | Imahashi | 301/108 A |

*Primary Examiner*—Charles A. Marmor
*Attorney, Agent, or Firm*—Young & Thompson

[57] ABSTRACT

A wheel cover for vehicle wheels consists of a disc-shaped member with a central opening and a plate which closes the opening and is held in place by axial springs at the edge of the opening. The springs have inner gripping surfaces designed to grip around a wheel hub, for example, between them. When the plate is put in place, the grip of the springs around the hub is increased.

8 Claims, 2 Drawing Figures

U.S. Patent    Nov. 25, 1980    4,235,476

WHEEL COVER FOR VEHICLE WHEELS

The present invention relates to a wheel cover for vehicle wheels, comprising a disc-shaped member designed to cover the portion of a wheel rim in which the wheel nuts are located, and spring members joined to the disc-shaped member which are intended to engage the wheel rim to hold the disc-shaped member on the rim.

Wheel covers of this type used up to now have been held in place by the spring members being snapped into holes in the wheel rim made especially for this purpose. The mounting of the wheel cover is usually accomplished by "pounding" it into place with the hand. For this reason, the wheel cover must be dimensioned to prevent denting, making for a relatively heavy wheel cover, whose spring members must be dimensioned so that the inertial forces do not throw off the cover when the vehicle is driven on a bumpy road. This makes the wheel cover difficult to put on and take off without damaging the cover or wheel rim.

Another type of wheel cover uses bosses on the wheel rim to hold it in place. The cover is made with an edge flange which is forced over the bosses. In order to prevent denting and to make sure that it stays securely in place, the cover must be made of relatively thick material in this case as well, thus making the cover expensive, especially if the material is stainless steel as is often the case. As in the preceding case, the cover is also difficult to put on and take off without damaging the rim.

The purpose of the present invention is to achieve a wheel cover which removes the above-mentioned disadvantages of known wheel cover constructions.

This is achieved according to the invention with a wheel cover of the type described in the introduction by the disc-shaped member having a central opening and in that at least two opposing, axially directed spring members are arranged at the edge of the opening, said spring members having inner legs with opposing gripping surfaces, intended to grip around a wheel hub between them, and outer legs with opposing gripping surfaces, intended to grip around between them a plate which closes the opening, the outer legs being disposed to be pressed apart as the plate is inserted between its gripping surfaces, to increase the grip of the inner legs around the hub by leverage effect between the outer and the inner legs.

The invention thus uses a separate plate, preferably in the form of an emblem, to increase the force between the spring members and the hub by leverage effect. Thus the spring force of the spring members can be relatively low, so that the cover can be easily put in place by pushing the spring members over the hub. Thus the cover need never be subjected to blows, which means that it can be made of thinner material than in previously known covers. When the plate is then pressed into place, the cover is locked to the hub and can only be taken off by first removing the plate. The plate has little mass and is therefore subjected to low inertial forces when the vehicle is driven on a bumpy road, which means that it requires relatively little spring force to prevent it from falling off.

Figure 2:
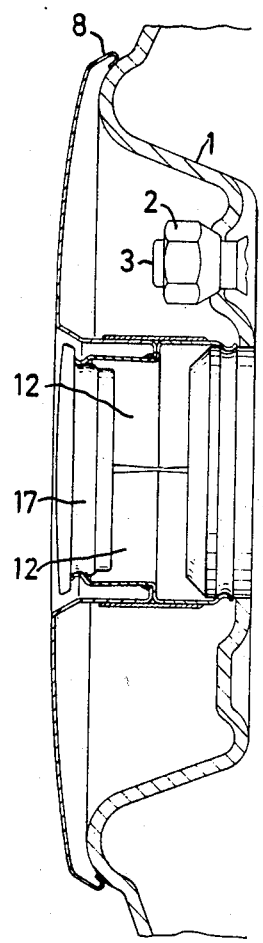

The invention will be described in more detail with reference to the example shown in the accompanying drawing, in which FIGS. 1 and 2 show axial extensions through a vehicle wheel rim with a wheel cover according to the invention during and after mounting, respectively.

1 designates the central portion of a wheel rim which is held securely by means of nuts 2 to hub bolts 3 on a hub 4 which has a peripherally concave groove 5.

The rim 1 is provided with a wheel cover according to the invention, generally designated 6, comprising a disc-shaped member 7, the edge 8 of which abuts against the rim 1. The disc-shaped member 7 has a central opening 9 from which an edge flange 10 extends axially towards the hub 4. The edge flange ends in a radially directed end portion 11.

The cover in the example shown is provided with three arcuate spring members 12, parts of two of which are shown in the figure. Each spring member has an axial outer leg 13, an axial inner leg 14 and a radial portion 15 between the two which abuts the end portion 11 of the edge flange. The outer end portion of the outer legs 13 is made with convex arcuate gripping surfaces 16, which in FIG. 2 engage in a peripheral, concave groove 17 in a loose plate 18 which is preferably made as an emblem. In a corresponding manner, the inner end portion of the inner legs 14 is made with convex arcuate gripping surfaces 19 which grip into the peripheral groove 5 in the hub 4. The spring members 12 are kept in place on the flange 10 with the aid of leaf springs 20 fastened, by welding for example, to the respective inner leg and extending over the flange 10, and a bead 21 on the respective outer leg on the outside of the flange portion 11. Alternatively, the leaf springs 20 can also be welded onto the flange 10, making the bead unnecessary, but it is preferable to have the embodiment shown because of manufacturing considerations, since the spring members then need only be snapped onto the flange 10.

The mounting of the wheel cover is accomplished simply by pushing the inner ends of the spring members axially over the hub 4 until, by the effect of the resilient force of the leaf springs, the inner gripping surfaces 19 snap into the groove 5; and the plate is then inserted in between the outer ends, so that the outer gripping surfaces 16 snap into the groove 17 of the plate. The diameter of the groove 17 is somewhat greater than the diameter of the circle on which the outer gripping surfaces 16 lie before the plate is inserted, which means that the outer legs 13 are pressed apart somewhat in the position shown in FIG. 2. The leverage effect thus increases the force of the inner legs 14 against the hub 4.

When the wheel cover is mounted on the hub, only the leaf springs 20 act as spring members. Thus the "grip" between the spring members and the wheel hub, i.e. the difference between the diameter of the groove 5 and the diameter of the circle on which the gripping surfaces 16 of the inner legs 14 lie, can be made greater than the corresponding "grip" between the spring members and the plate. If the outer and inner legs, 13 and 14 respectively, are of the same length, this means that more force will be required to pull off the disc-shaped cover member 7 from the hub 4 than is required to press in the plate 18 between the outer legs 13 of the spring members.

Thus the invention provides a wheel cover which is held securely on the rim at that same time as it is simple to put on and take off without the risk of damaging the cover or wheel rim. Due to the fact that the cover can be made of thinner material, it can be made less expensively than conventional covers as well.

The embodiment of the cover described can be modified in different ways. For example, the number of spring members 12 can vary from at least two and upwards. Three members are preferable however. Furthermore, the emblem plate 18 need not be completely removable from the cover member 7. It can, for example, be provided with an additional groove to the right of groove 17. This additional groove would have a smaller diameter than the groove 17, so that the load is taken off the legs 13 when the plate is pulled out so that the gripping surfaces 16 snap into the additional groove. A completely removable plate provides a stronger "grip" however between the hub groove and the inner legs of the spring members.

In the preceding, the cover has been described attached to a hub 4. The legs 14 of the cover can of course grip around other suitable members, e.g. a circular grooved edge of the rim itself.

What I claim is:

1. Wheel cover for vehicle wheels, comprising a disc-shaped member designed to cover the portion of a wheel rim in which the wheel nuts are located, and spring members joined to the disc-shaped member which are intended to engage a wheel hub to hold the disc-shaped member on the rim, characterized in that the disc-shaped member has a central opening and in that at least two opposing, axially directed spring members are arranged at the edge of the opening, said spring members having inner legs with opposing gripping surfaces intended to grip around the wheel hub between them, and outer legs with opposing gripping surfaces intended to grip around between them a plate which closes the opening, the outer legs being disposed to be pressed apart as the plate is inserted between their gripping surfaces to increase the grip of the inner legs around the hub by leverage effect between the outer and the inner legs.

2. Wheel cover according to claim 1, characterized in that the central opening has an axially inwardly bent edge flange, and that the spring members are supported against the flange at a distance from the plane of the opening.

3. Wheel cover according to claim 2, characterized in that the axially inwardly bent edge flange has a radially directed end portion which forms a support for the spring members.

4. Wheel cover according to claim 3, characterized in that the spring members are formed so that the inner gripping surfaces lie on a circle whose diameter is greater than the diameter of the circle on which the outer gripping surfaces lie.

5. Wheel cover according to claim 3 or 4, characterized in that the radial end portion of the axially inwardly bent edge flange is located approximately midway between the outer and the inner gripping surfaces.

6. Wheel cover according to claim 1, characterized in that the gripping surfaces are convex in longitudinal section for engaging concave peripheral grooves in the hub.

7. Wheel cover according to claim 4, characterized in that the spring members at the transition between the outer and inner legs have a radial portion which abuts the radial end surface of the edge flange, that the outer leg of the spring members has a bead on the opposite side of the end portion, and that the inner leg has an extension which extends over the outer surface of the edge flange.

8. Wheel cover according to claim 7, characterized in that said extension is a portion of a leaf spring which also extends over the inner leg and is securely fixed to the same.

* * * * *